(12) United States Patent
Skarnes (10) Patent No.: US 10,393,306 B2
(45) Date of Patent: Aug. 27, 2019

(54) FATIGUE LIFE EXTENDER

(71) Applicant: NEXANS, Paris (FR)

(72) Inventor: Gunnar Skarnes, Halden (NO)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 15/722,607

(22) Filed: Oct. 2, 2017

(65) Prior Publication Data

US 2018/0094762 A1 Apr. 5, 2018

(30) Foreign Application Priority Data

Oct. 5, 2016 (EP) .................................... 16306314

(51) Int. Cl.

| | | |
|---|---|---|
| *F16L 57/00* | (2006.01) | |
| *F16L 57/06* | (2006.01) | |
| *F16L 57/02* | (2006.01) | |
| *E21B 17/01* | (2006.01) | |
| *H02G 15/007* | (2006.01) | |
| *E21B 43/01* | (2006.01) | |
| *F16L 5/00* | (2006.01) | |
| *H02G 9/02* | (2006.01) | |

(52) U.S. Cl.
CPC ............ *F16L 57/06* (2013.01); *E21B 17/017* (2013.01); *E21B 43/0107* (2013.01); *F16L 5/00* (2013.01); *F16L 57/02* (2013.01); *H02G 15/007* (2013.01); *H02G 9/02* (2013.01)

(58) Field of Classification Search
CPC ..... F16L 1/20; F16L 1/24; F16L 3/137; F16L 13/163; F16L 33/04

USPC ................................. 138/110, 109; 428/67.5
See application file for complete search history.

(56) References Cited

U.S. PATENT DOCUMENTS

| | | | | |
|---|---|---|---|---|
| 2,295,830 | A * | 9/1942 | Carlson .................... | F16L 35/00 138/110 |
| 2,340,713 | A * | 2/1944 | Tinnerman ............ | F16L 3/1233 174/40 CC |
| 2,776,151 | A * | 1/1957 | Harkenrider ............ | F16L 47/24 285/144.1 |
| 3,858,914 | A * | 1/1975 | Karie ...................... | F16L 47/24 285/148.13 |
| 4,367,967 | A * | 1/1983 | Albert, Jr. ............ | G02B 6/4478 138/110 |
| 4,633,801 | A | 1/1987 | Marshall | |
| 4,647,255 | A * | 3/1987 | Pow ......................... | B21D 9/03 405/168.1 |
| 4,776,616 | A * | 10/1988 | Umehara ............... | F16L 13/163 285/133.21 |

(Continued)

OTHER PUBLICATIONS

International Search Report dated Mar. 22, 2017.

*Primary Examiner* — Patrick F Brinson
(74) *Attorney, Agent, or Firm* — Sofer & Haroun, LLP (57) ABSTRACT

A fatigue life extender (10) has a cylindrical body (13) having a throughgoing passage (20), arranged to be incorporated at an end of a connection device such as a clamp (11). The cylindrical body has a mouth portion (18), the interior circumference of which is lined with a ring or band (22) of resilient material such as rubber or an elastomeric compound. The ring or band (22) is crosshatched into a grid creating a plurality of rectangular segments (24) of resilient material by a plurality of perpendicular cuts extending less than completely through the thickness of the material.

11 Claims, 7 Drawing Sheets

(56) References Cited

U.S. PATENT DOCUMENTS

| | | | | |
|---|---|---|---|---|
| 4,805,933 A | * | 2/1989 | Swisher | F16L 33/22 |
| | | | | 285/115 |
| 5,333,650 A | * | 8/1994 | Folkman | F16L 33/34 |
| | | | | 138/103 |
| 5,857,711 A | * | 1/1999 | Comin-DuMong | B25B 13/06 |
| | | | | 285/115 |
| 7,069,958 B2 | * | 7/2006 | Filho | E21B 17/017 |
| | | | | 138/106 |
| 7,568,861 B2 | * | 8/2009 | Godoy | E21B 17/017 |
| | | | | 138/106 |
| 7,988,204 B2 | * | 8/2011 | Lewis | B21K 1/16 |
| | | | | 285/286.1 |
| 8,172,275 B2 | * | 5/2012 | Sumrall, Jr. | B21K 1/16 |
| | | | | 285/286.1 |
| 8,863,682 B2 | * | 10/2014 | Horton, III | F16L 3/12 |
| | | | | 114/293 |
| 2009/0179420 A1 | | 7/2009 | Gai et al. | |
| 2009/0272855 A1 | | 11/2009 | Oram | |

\* cited by examiner

FATIGUE LIFE EXTENDER

RELATED APPLICATION

This application claims the benefit of priority from European Patent Application No. 16 306 314.2, filed on Oct. 5, 2016, the entirety of which is incorporated by reference.

BACKGROUND

Field of the Invention

The present invention is related to a fatigue life extender for tubular elements such as a subsea cable or pipeline, a riser, an umbilical or any other similar device. The present invention is especially relevant for such tubular elements that are clamped together or affixed to a rigid structure at a hangoff point, where the tubular element is relatively free to repeatedly move radially such that fatigue of the tubular elements at the clamping position or a hangoff point must be taken into consideration.

Description of Related Art

Tubular elements such as subsea cables, subsea pipelines, umbilicals and similar devices are often connected to another element. For example, two sections of tubular elements may be clamped together with a clamping device at a given position, for example the bottom of the sea. In other situations, a tubular device is affixed to a structure, for example at a hangoff point at an offshore platform, at the entry point to an offshore structure and the like. A connection device secures the tubular element to the other element. A challenge, especially in an offshore application, is that the tubular element is often relatively free to move or bend in a radial direction. Because the tubular element is often relatively more flexible than the connection device such as the clamp or hangoff point, the tubular element will gradually deteriorate due to fatigue.

The fatigue arises from the movements of the part of the tubular element, which is, to a certain degree, is relatively free to move in the water. Movements in the water, due for example to water currents or water waves, result in the tubular element being repeatedly bent a small angle in different directions radially at any point where it is clamped or affixed, and with time the repeated bending of the tubular element may result in fatigue damage and even a sudden fracture of the tubular element.

Bending stiffeners are well known in the art, for example in WO 94/09245 A1. The objective of bending stiffeners are primarily to prevent a tubular element from being bent beyond a critical angle where the cable obtains a radius of curvature which is smaller than what the capable is capable of withstanding without being permanently damaged.

The bending stiffener in WO 94/09245 is designed to prevent a tubular element, such as guiding cable, a riser or an umbilical, on which the bending stiffener is arranged, from being bent beyond its capacity, and will in addition also provide improved fatigue life of the bending stiffener itself. The bending stiffener is made of a steel flange at one end for mounting of the bending stiffener to a receiving station. The bending stiffener is further made of a number of elements including axial aramide reinforcements, circumferential aramide reinforcement, cross-laid steel cord, natural rubber compound, rayon pearls and an outer layer of nephrene.

This is a complicated and expensive bending stiffener design, and it is also time consuming to mount on the cable, pipeline, riser or umbilical etc., if not practically impossible, especially if mounted at distance from the end of the cable, pipeline, riser, umbilical etc. for example at a location along the length of the cable or pipeline when a relatively stiff section is clamped to a relatively flexible section.

OBJECTS AND SUMMARY

The object of the present invention has been to obtain a fatigue life extender for a cable, a pipeline, a riser, an umbilical or any other similar device, which has a simple design and has a lower cost of manufacturing than known solutions.

It has also been an object to provide a fatigue life extender, which is simple and quick to mount or incorporate into known connection devices such as clamps, hangoff points, J-Tube entry points and the like.

These objects are achieved with a fatigue life extender as defined in independent claim 1.

Further embodiments of the fatigue life extender is defined in the dependent claims.

According to one aspect, the fatigue life extender of the invention is arranged to be incorporated in or otherwise form a component of a connection device for securing a tubular element such as a cable or pipeline to another object. The other object may be another tubular element, in which instance the connection device in which the fatigue life extender is incorporated is in the form a clamp for connecting the two tubular elements.

The other object may likewise be a permanent structure, in which case the connection device in which the fatigue life extender is incorporated is in the form of an entry point into the structure. Examples of such entry points are hangoff points at offshore platforms, or so-called "J-Tube" entry devices utilized in offshore wind turbine monopoles.

The fatigue life extender of the invention comprises a cylindrical body having a throughgoing passage, arranged to be incorporated at an end of a connection device such as a clamp. The cylindrical body has a mouth portion, the interior circumference of which is lined with a ring or band of resilient material such as rubber or an elastomeric compound. As used herein the term "resilient" refers to a property known in material science describing a substance or object able to recoil or return to its original form or position after being bent, compressed or stretched. In particular, in the context of bend stiffeners, fatigue life extenders and the like, the term "resilient" refers to a material or object comprising the bend stiffener or fatigue life extender that engages a tubular element and that may be compressed, stretched or bent by radial movement of the tubular element, for example under influence of waves or ocean currents and recoil or return to its original shape, form or position. The term "resilient" should be understood to include degrees of resiliency less than 100%, provided that the resiliency of the material is sufficient to absorb and/or counteract the forces of radial bending of the tubular element.

According to one aspect, the ring or band is crosshatched into a grid creating a plurality of rectangular segments of resilient material by a plurality of perpendicular cuts extending less than completely through the thickness of the material. The cross-hatching allows the ring or band to be wrapped along the inner circumference of the mouth of the cylindrical body. Preferably, the band has a variable degree of resiliency along its longitudinal length. For example, a portion of the band at the distal end of the mouth portion of the cylindrical body can be less resilient than the portion of the band further to the interior of the cylindrical body. This may be achieved by arranging the spacing of transverse crosshatchings such that larger segments of resilient material are arranged at the interior end of the mouth portion, and increasingly smaller segments are arranged towards the distal end of the mouth portion of the cylindrical body. This arrangement provides a greater degree of flexibility at the mouth of the connection device where the bending motion is the greatest, while providing greater stiffness further to the interior of the connection device, which aids in securing the cable or pipeline by the connection device.

BRIEF DESCRIPTION OF THE DRAWINGS

Other features and advantages of the present invention will appear from the following non-limiting description of a preferred embodiment of the invention, with reference to the figures, where.

DETAILED DESCRIPTION

Figure 1:
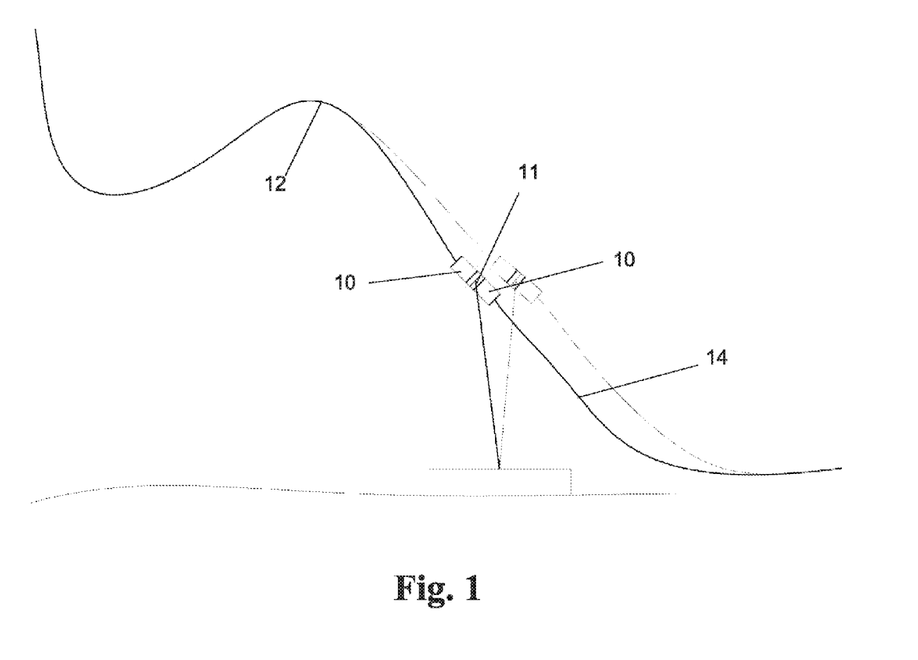
FIG. 1 is a side view of two cable or pipeline sections connected by a connection device in the form of a clamp, in which is arranged a fatigue life extender of invention at each end of the clamp.

FIG. 1 illustrates an embodiment of a fatigue life extender 10 according to the invention incorporated in a connection device in the form of a clamp 11 connecting a first cable or pipeline section 12 to a second cable or pipeline section 14 in a subsea environment. FIG. 1 illustrates two fatigue life extenders 10 arranged at each end of a clamp 11. FIG. 1 further illustrates the fact that such subsea cables or pipeline are subject to movement by currents, waves and the like, cause bending forces at the interface of a cable section with the fatigue life extender 10.

Figure 2:
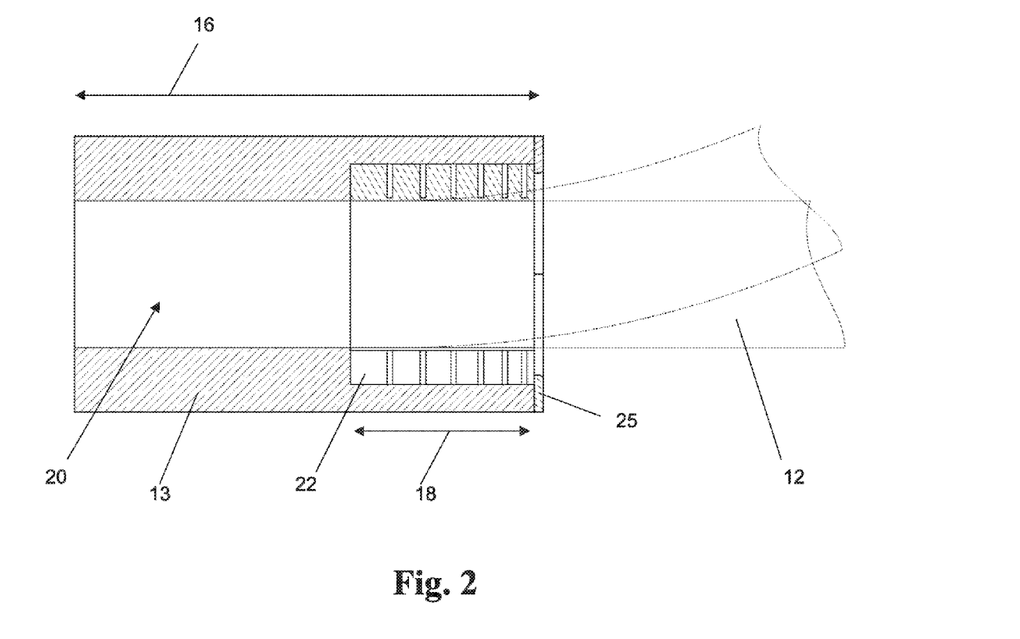
FIG. 2 is a side cross sectional view of a an end portion of a fatigue life extender, illustrating the possible bending of a connected cable or pipeline, viewed along line A from FIG. 4.

Fatigue life extender 10 comprises an essentially cylindrical body 13 having a cylindrical passage 20. At one end of the cylindrical body 13 is an end portion 16, at the distal end of which is a mouth portion 18, as shown in FIG. 2. At the mouth portion 18, the thickness of the material of cylindrical body 13 is reduced, creating an area of increased diameter of cylindrical passage 20.

Figure 3:
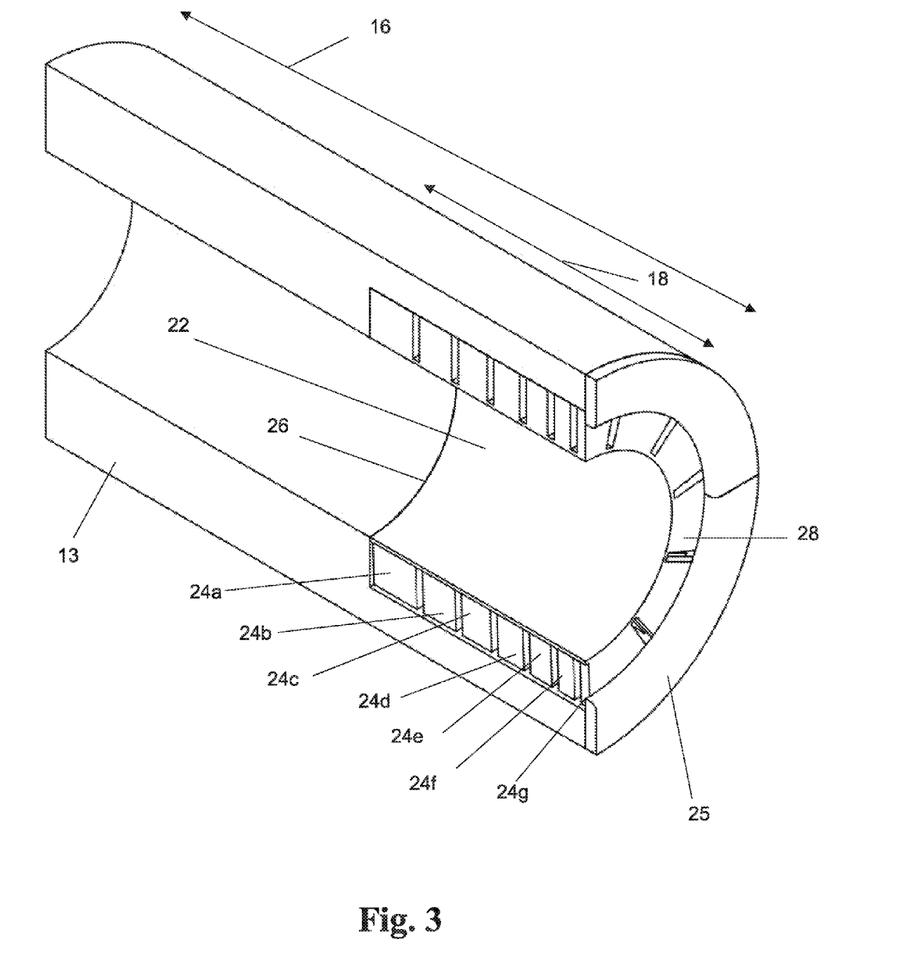
FIG. 3 is a split perspective view of an end portion of a fatigue life extender and the internally arranged resilient band.
Figure 5:
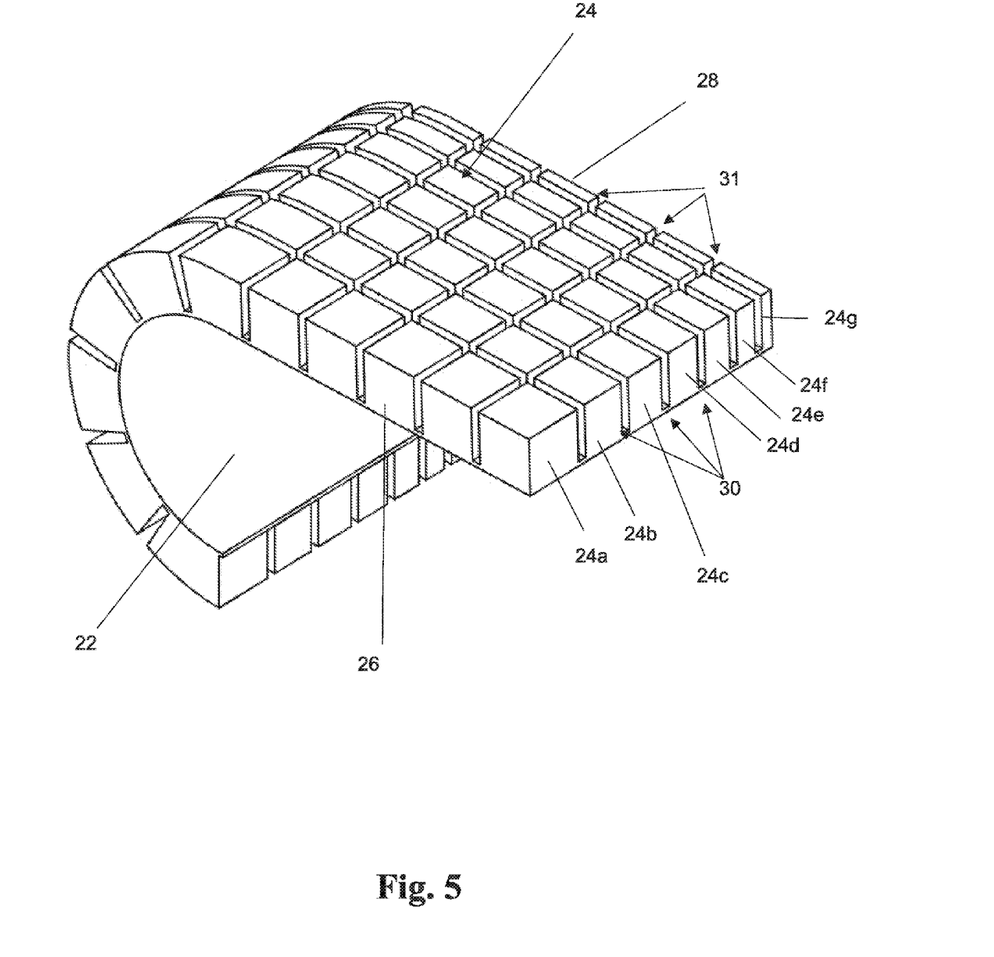
FIG. 5 is a perspective view of the resilient, cross-hatched band.

A band of resilient material 22 as shown in FIG. 5 is arranged inside mouth portion 18 as shown in FIG. 3. The resilient material may be natural rubber, an elastomeric compound, polyurethane and the like. The resiliency or hardness of the material will be dependent upon the use scenario, for example, the material may have a value of Shore A 40-90.

Figure 4:
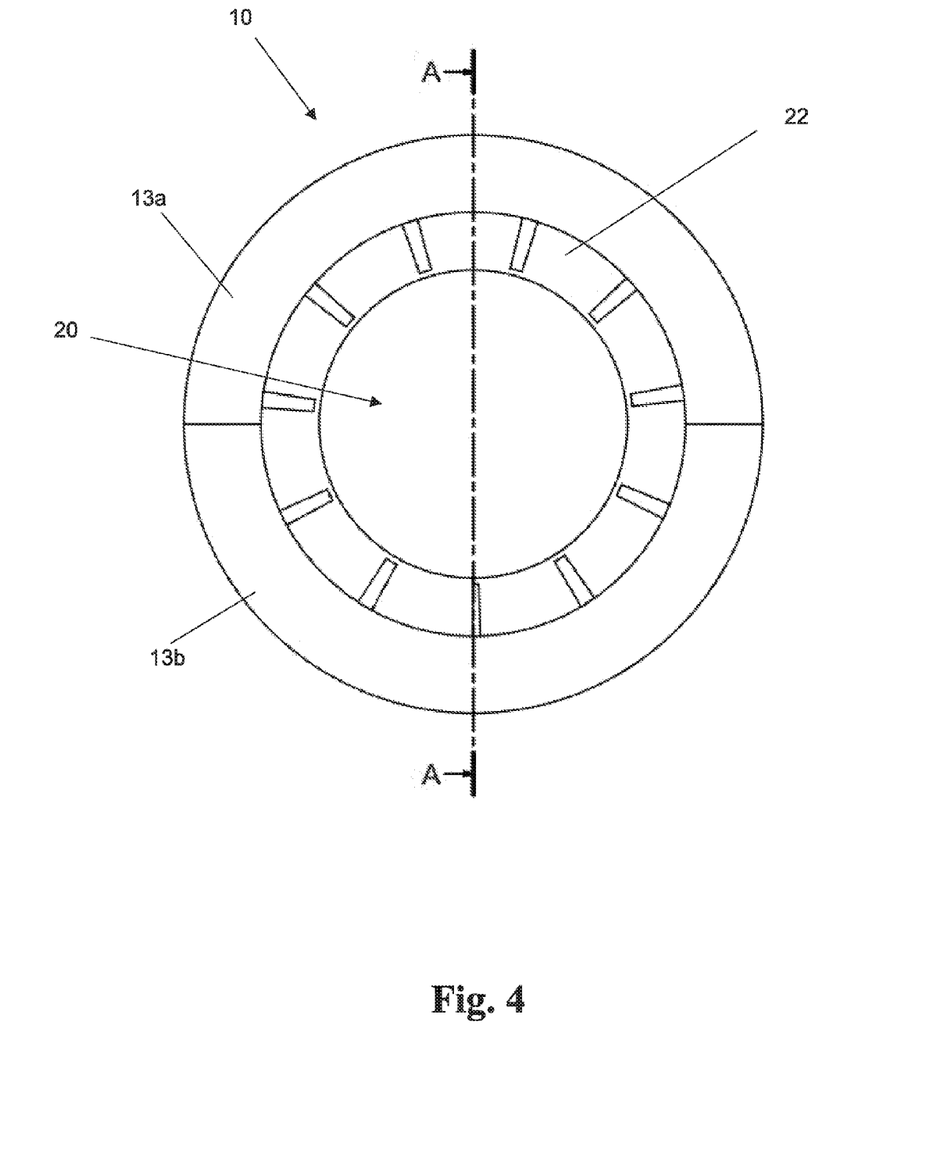
FIG. 4 is a front cross sectional view of the mouth portion of a fatigue life extender.

Band 22 may be installed by rolling a band 22 having appropriate length into a cylindrical shape, and inserting the band into the mouth portion 18. Band 22 is retained in mouth portion 18 by a retaining flange 25. In an alternate embodiment, shown in FIG. 4, cylindrical body 13 may comprise two half cylindrical sections 13a and 13b connected together.

As shown in FIG. 5, band 22 is crosshatched into a grid of rectangular segments 24 by longitudinal cuts 31 and transverse cuts 30 that extend less than completely through the thickness of the band 22. In a preferred embodiment, the band 22 has in increasing degree of flexibility from its inner end 26 to its outer end 28. According to one aspect, the increasing degree of flexibility is achieved by gradually decreasing the spacing between transverse hatch lines 30. This gradual decrease in spacing creates decreasingly sized rectangular segments 24a-24g. As seen in FIG. 3, the smallest of such rectangular segments are arranged at the distal end of mouth portion 18, where the bending motion of cable or pipeline section 14 is the greatest, as seen in FIG. 2.

Figure 6:
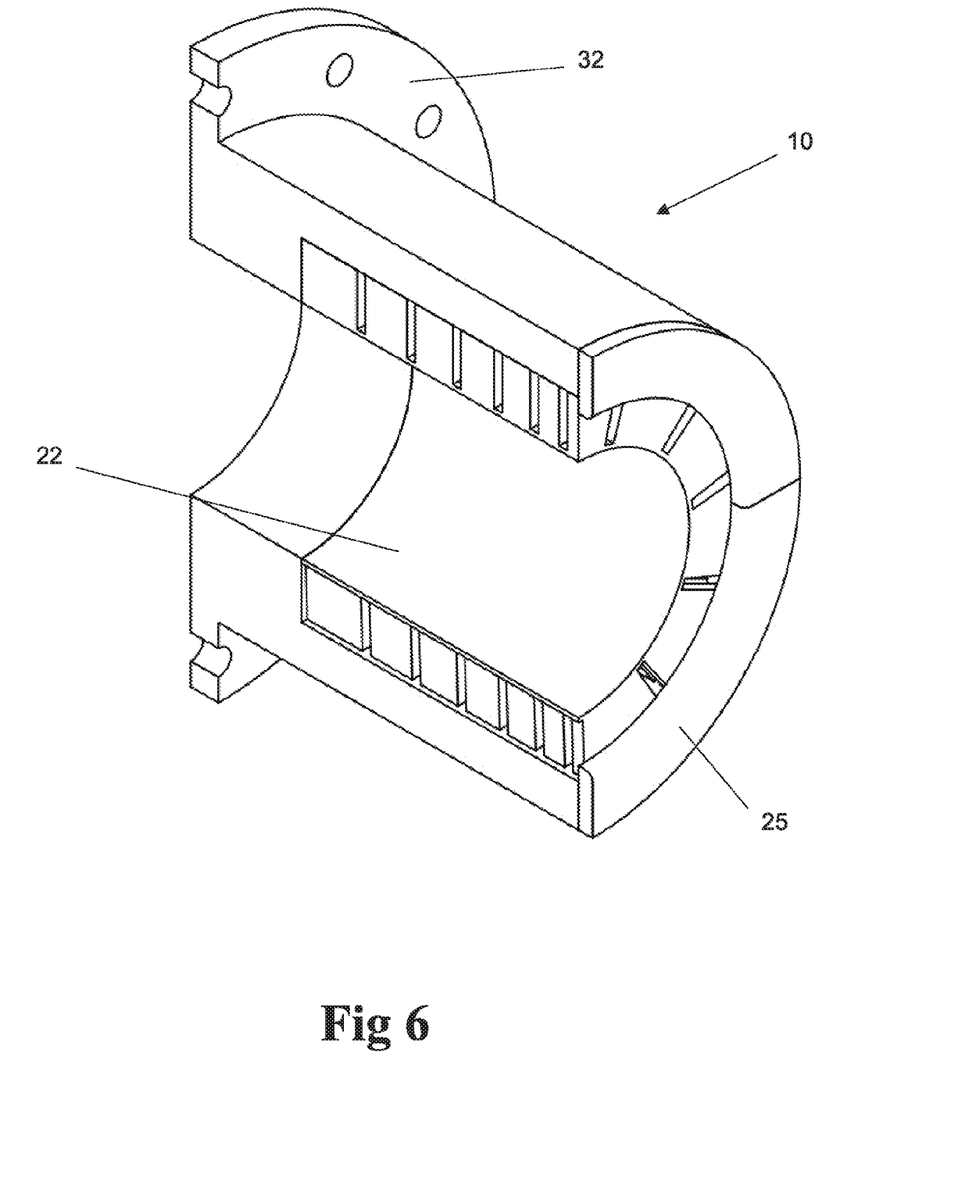
FIG. 6 is a perspective view of an embodiment of a fatigue life extender with a connection flange.
Figure 7:
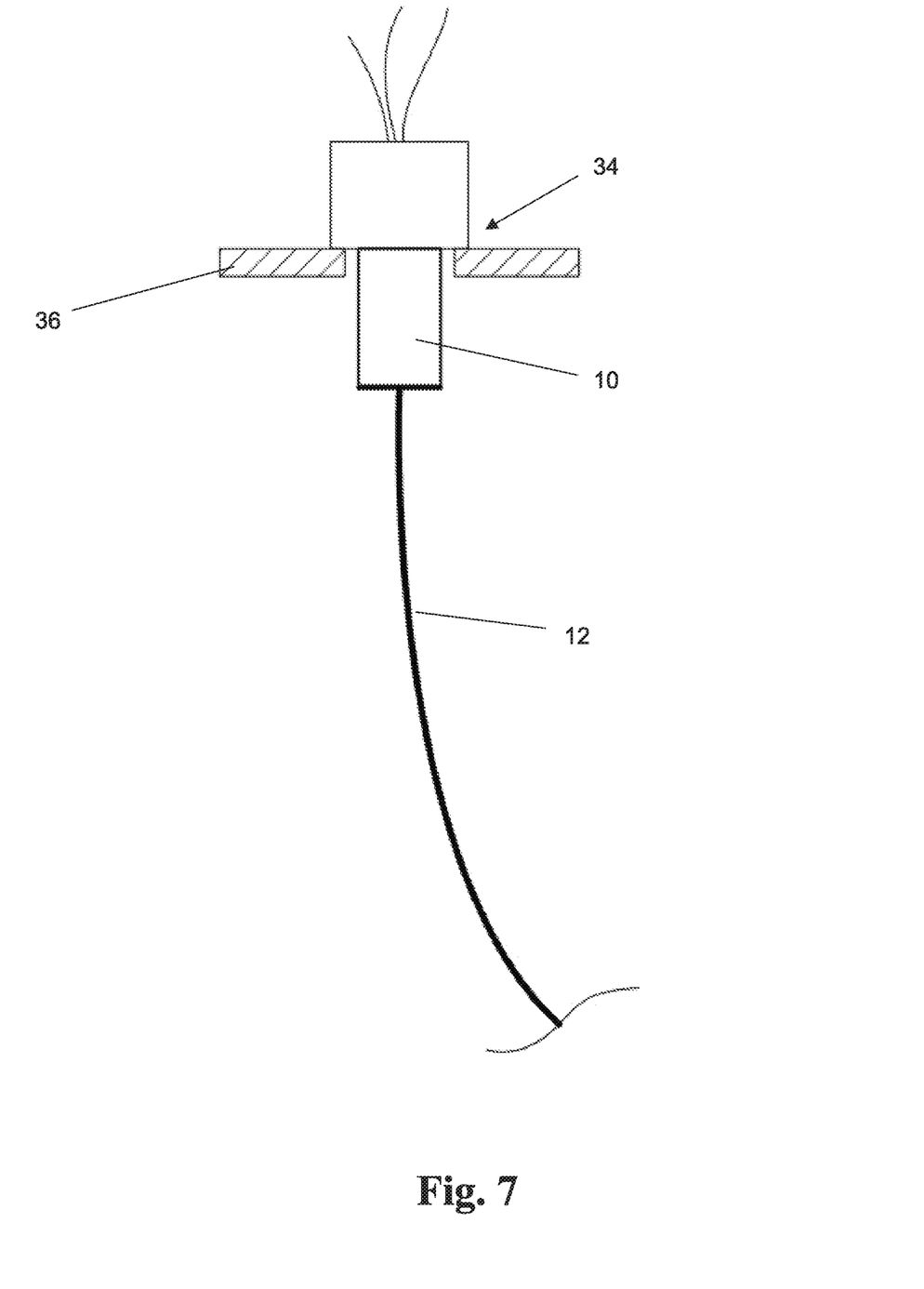
FIG. 7 is side view illustrating the fatigue life extender arranged at a hangoff point of a structure.

The fatigue life extender 10 may be incorporated into a connection device such as clamp 11 as seen in FIG. 1, a hangoff point 34 of a structure 36 as seen in FIG. 7, a J-Tube entry point and the like. According to one embodiment, the cylindrical body 13 of the connection device comprises a connection flange 32 at the end opposite the mouth portion 18 as shown in FIG. 6. The connection flange 32 may be bolted to a hangoff, J-tube, end of a clamping device etc.

The invention claimed is:

1. A fatigue life extender for any one of an electrical cable, a pipeline, a riser, an umbilical, the fatigue life extender comprising:
    an essentially cylindrical body having a through-going cylindrical passage for receiving the tubular element, wherein the cylindrical body has at least one end portion, at the distal end of which is a mouth portion, wherein a cylindrical band of resilient material is arranged in the interior of mouth portion,
    wherein the resilient band has a decreasing degree of resiliency in the longitudinal direction of the cylindrical body from an inner end of the band to an outer end of the band.

2. The fatigue life extender according to claim 1, wherein the cylindrical body has reduced thickness in the area of the mouth portion at the mouth portion for receiving the resilient material.

3. The fatigue life extender according to claim 1, wherein the fatigue life extender is arranged to be connected to or incorporated in the connection device for connecting the tubular element to another object.

4. The fatigue life extender according to claim 3, wherein the other object is a second tubular element and the connection device is a clamp.

5. The fatigue life extender according to claim 3, wherein the other object is a structure, and the connection device is a hangoff point.

6. The fatigue life extender according to claim 1, wherein the resilient band is crosshatched by longitudinal and transverse hatch cuts extending less than completely through the thickness of the band into a grid of rectangular segments.

7. The fatigue life extender according to claim 6, wherein the spacing of the transverse hatch cuts gradually decreases in the longitudinal direction of the cylindrical body from an inner end to an outer end of the band, thus creating a plurality of rectangular segments decreasing in size towards the distal end of the mouth portion.

8. The fatigue life extender according to claim 1, wherein the band is retained in mouth portion by a retaining flange at the distal end of the mouth portion.

9. The fatigue life extender according to claim 1, wherein cylindrical body comprises a connection flange for connecting the fatigue life extender to a connection device.

10. The fatigue life extender according to claim 1, wherein cylindrical body comprises two half-cylindrical sections.

11. The fatigue life extender according to claim 1, wherein the resilient ban is made of natural rubber or an elastomeric compound having Shore A hardness value of from 40-90.

* * * * *